United States Patent
Nguyen et al.

(10) Patent No.: US 7,160,144 B2
(45) Date of Patent: Jan. 9, 2007

(54) EJECTION MECHANISM AND METHOD FOR SAME

(75) Inventors: Bach L. Nguyen, Lauderhill, FL (US); Donald W. Burnette, Sunrise, FL (US); Michael J. Pescetto, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 162 days.

(21) Appl. No.: 11/021,375

(22) Filed: Dec. 23, 2004

(65) Prior Publication Data

US 2006/0141875 A1 Jun. 29, 2006

(51) Int. Cl.
*H01R 3/00* (2006.01)

(52) U.S. Cl. .................. 439/500; 439/483; 429/97
(58) Field of Classification Search ............... 439/500, 439/892, 893, 923, 483, 476.1; 429/97
See application file for complete search history.

(56) References Cited

U.S. PATENT DOCUMENTS 5,716,730 A * 2/1998 Deguchi ................. 429/97
2004/0224556 A1* 11/2004 Qin et al. ................. 439/500
2004/0229114 A1* 11/2004 Liang et al. ............. 429/100
2006/0115715 A1* 6/2006 Ge et al. ................... 429/97

FOREIGN PATENT DOCUMENTS

JP 2003-211782 * 1/2003

* cited by examiner

*Primary Examiner*—Tho D. Ta
(74) *Attorney, Agent, or Firm*—Larry G. Brown

(57) ABSTRACT

The invention concerns an ejection mechanism (110). The ejection mechanism can include a movable ejection button (118) having at least one wing (124) and a cover (112) having at least one first projection (130) and at least one second projection (138). When the ejection button is in a first position, the first projection of the cover can engage the wing of the ejection button, and the second projection can engage a slot (140) of a housing (114). The second projection engaging the slot of the housing can cause a force (F) to be generated at an opposing end (131) of the cover. Also, when the ejection button is moved to a second position, the first projection of the cover can disengage the wing of the ejection button, and the generated force can cause the cover to move away from the housing.

18 Claims, 5 Drawing Sheets

EJECTION MECHANISM AND METHOD FOR SAME

BACKGROUND OF THE INVENTION

1. Field of the Invention

This invention relates in general to ejection mechanisms and more particularly ejection mechanisms for releasing components of portable electronic devices.

2. Description of the Related Art

In today's marketplace, consumers have numerous portable electronic devices, such as cellular telephones and personal digital assistants, from which to choose. Most of these devices have one or more removable panels or covers for protecting certain components or for adding to the aesthetic appearance of such units. For example, many cellular telephones include battery covers that couple to a telephone's housing and secure a battery to the telephone. Many of these battery covers are also stylish and consumers will purchase after-market units to individualize their mobile units.

As they are removable from cellular telephones, the battery cover as well as the housing of the cellular telephone may include structure for facilitating such a feature. In particular, in most cases, a movable mechanism or button is incorporated into the battery cover or the housing to enable the battery cover to be removed from the telephone. These mechanisms, however, require the consumer to grasp the edges of the battery cover or to slip a fingernail between the battery cover and the telephone housing to lift the battery cover away. To do so, a user must have a certain amount of dexterity, something that may be lacking in elderly or disabled persons.

In addition, some manufacturers have inserted foam padding on the inside surface of the battery cover, which can cause an opposing force to be exerted against the inside surface when the battery cover is coupled to the housing. When the movable mechanism or button is released, the opposing force can force the battery cover to move slightly in a direction away from the housing. Such a process can make the step of grasping the battery cover easier. Unfortunately, this structure adds to the overall thickness of the cellular telephone, a highly undesirable trait in the current state of mobile communications units.

SUMMARY OF THE INVENTION

The present invention concerns an ejection mechanism. The ejection mechanism can include a movable ejection button, which can have at least one wing, and a cover, which can have at least one first projection and at least one second projection. When the ejection button is in a first position, the first projection of the cover can engage the wing of the ejection button, and the second projection can engage a slot of a housing. The second projection engaging the slot of the housing can cause a force to be generated at an opposing end of the cover. Also, when the ejection button is moved to a second position, the first projection of the cover can disengage the wing of the ejection button, and the generated force can cause the cover to move away from the housing.

In one arrangement, when the ejection button is moved back to the first position from the second position, the ejection button can cause the cover to move farther away from the housing. In another arrangement, the cover can have a horizontal axis, and the second projection of the cover can extend at a predetermined angle with respect to the horizontal axis of the cover. Further, the wing of the ejection button can include a sliding surface that can contact the first projection. This contact can cause the first projection to move away from the housing when the ejection button is moved back to the first position from the second position, which can cause the cover to move farther away from the housing. As an example, the cover can be a battery cover, and the housing can be part of a portable electronic device.

In another arrangement, the ejection button can further include a head that can extend beyond the housing, and the head can receive an object that will move the ejection button. The ejection mechanism can also include a flexible portion. At least part of the flexible portion can be positioned against the ejection button, and the flexible portion can be biased to maintain the ejection button in the first position. The ejection button can further have a cylindrical portion that can mate with a pivot point and can facilitate the movability of the ejection button. As an example, the first projection can be positioned at a first end of the cover, and the second projection can be positioned at an opposing second end of the cover.

The present invention also concerns a portable electronic device. The portable electronic device can have a housing having at least one slot, a movable ejection button, which can have at least one wing, and a cover, which can have at least one first projection and at least one second projection. When the ejection button is in a first position, the first projection of the cover can engage the wing of the ejection button, and the second projection can engage the slot of the housing. The second projection engaging the slot of the housing can cause a force to be generated at an opposing end of the cover. When the ejection button is moved to a second position, the first projection of the cover can disengage the wing of the ejection button, and the generated force can cause the first projection of the cover to disengage from the wing of the ejection button. The generated force can also cause the cover to move away from the housing.

The present invention also concerns a method of operating an ejection mechanism. The method can include the steps of engaging at least one first projection and at least one second projection of a cover respectively to a wing of an ejection button and a slot of a housing in which the second projection engaging the slot causes a force to be generated at an opposing end of the cover and moving the ejection button from a first position to a second position. Moving the ejection button from the first position to the second position can cause the first projection of the cover to disengage the wing of the ejection button, and the generated force can cause the cover to move away from the housing.

The method can also include the step of moving the ejection button back to the first position from the second position in which the ejection button can cause the cover to move farther away from the housing. The method can also include the steps of removing the cover from the housing and biasing the ejection button in the first position.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION

Figure 1:
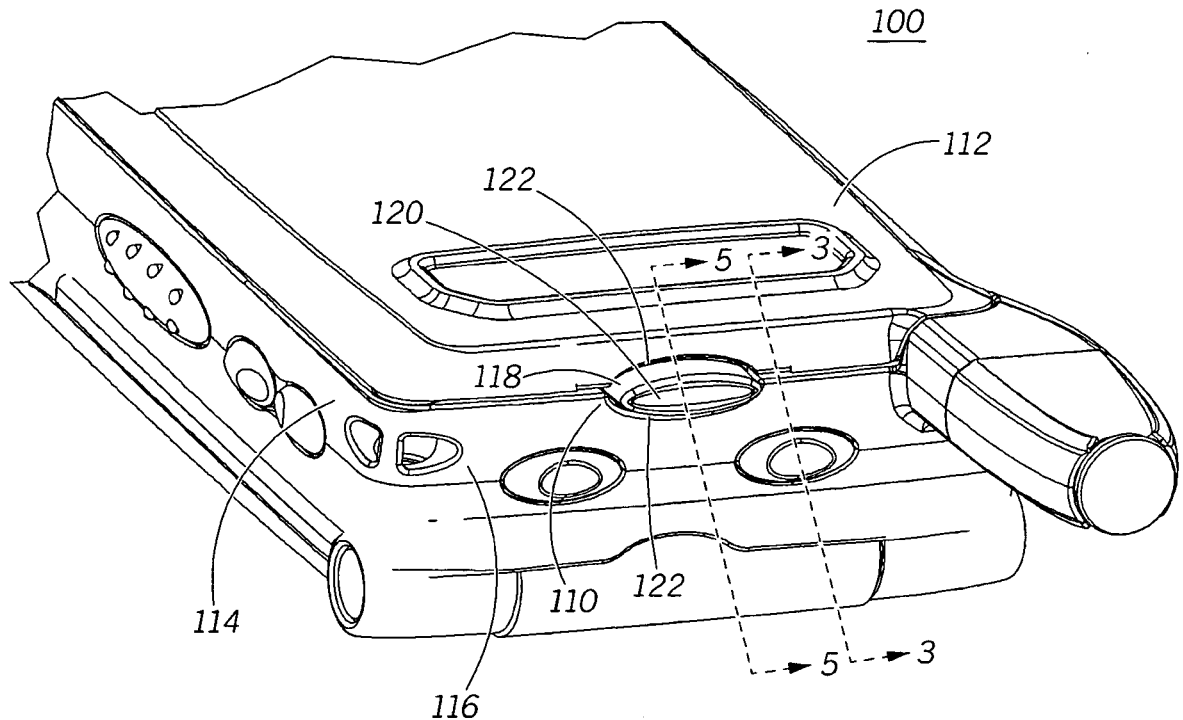
FIG. 1 illustrates a portion of a portable electronic device having an ejection mechanism in accordance with an embodiment of the inventive arrangements.

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The invention concerns a method and system for an ejection mechanism. In one arrangement, the ejection mechanism can include a movable ejection button having at least one wing and a cover having at least one first projection and at least one second projection. When the ejection button is in a first position, the first projection of the cover can engage the wing of the ejection button. In addition, the second projection can engage a slot of a housing, and the second projection engaging the slot of the housing can cause a force to be generated at an opposing end of the cover. When the ejection button is moved to a second position, the first projection of the cover can disengage the wing of the ejection button, and the generated force can cause the cover to move away from the housing.

In another arrangement, when the ejection button is moved back to the first position from the second position, the ejection button can cause the cover to move farther away from the housing. As an example, the ejection mechanism can be part of a portable electronic device, and the cover can be a battery cover.

Referring to FIG. 1, a system 100 having an ejection mechanism 110 is shown. In one embodiment, the ejection mechanism 110 can be for ejecting a cover 112 from a housing 114. As an example, the housing 114 and the ejection mechanism 110 can be part of a portable electronic device 116. The portable electronic device 116 can be a mobile communications unit, for example. As another example, the cover 112 can be a battery cover.

The ejection mechanism 110 can include an ejection button 118, which can be movable. Here, only a portion of the ejection button 118 is shown, which can be referred to as a head 120. The head 120 can extend above the housing 114. The cover 112 and the housing 114 can both have curved portions 122 for accommodating the head 120 of the ejection button 118. The head 120 can receive an object that will move the ejection button 118, such as a person's finger or some other tool.

Figure 2:
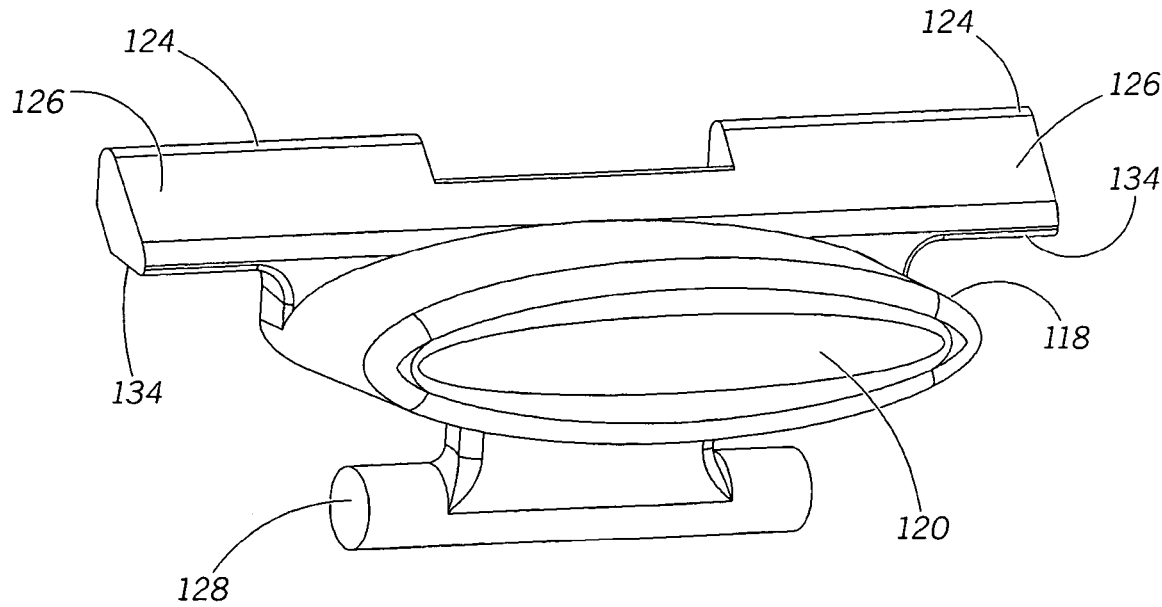
FIG. 2 illustrates a portion of the ejection mechanism of FIG. 1 in accordance with an embodiment of the inventive arrangements.

Referring to FIG. 2, an isometric view of the ejection button 118 is shown. In addition to the head 120, the ejection button 118 can include one or more wings 124, which can extend away from the head 120. The wings 124 can have one or more surfaces 126 that, as will be shown later, can push or force a portion of the cover 112 (see FIG. 1) to move away from the housing 114. The ejection button 118 can also include a cylindrical portion 128, which can extend in a direction that is generally parallel to the wings 124. As will be described below, the cylindrical portion 128 can mate with a pivot point (not shown here) to facilitate the movability of the ejection button 118.

Figure 3:
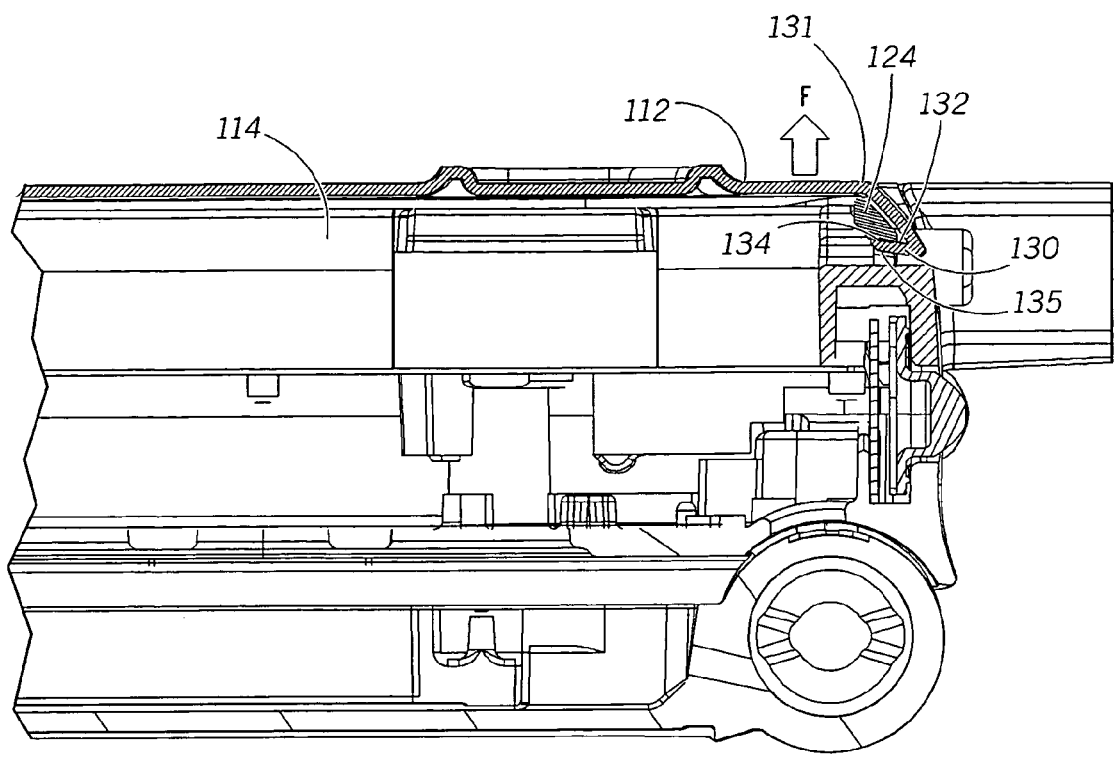
FIG. 3 illustrates a cross section of the portable electronic device of FIG. 1 taken along lines 3—3 in accordance with an embodiment of the inventive arrangements.

Referring to FIG. 3, a cross section of the system 100 of FIG. 1 taken along lines 3—3 is shown. In one arrangement, the system 100 can be in one of at least two stages, an open stage and a closed stage. As shown here, the system 100 can be considered in a closed stage. In the closed stage, the ejection button 118 may be in a first position, where the wings 124 of the ejection button 118 are engaged with one or more corresponding first projections 130 of the cover 112. Although due to the nature of the view shown in FIG. 3 only one first projection 130 is depicted, the cover 112 can have any suitable number of first projections 130. As an example, the number of first projections 130 that the cover 112 can have can correspond to the number of wings 124 on the ejection button 118. As an example, the first projections 130 can be positioned at a first end 131 of the cover 112.

In another arrangement, the first projections 130 can have a slanted engaging surface 132, which can be positioned against a corresponding slanted engaging surface 134 (see also FIG. 2) of the wings 124. This positioning, i.e., the ejection button 118 being in the first position, can keep the first projections 130 of the cover 112 engaged with the wings 124 of the ejection button 118, which can cause the cover 112 to be secured to the housing 114. It is understood, however, that any other suitable structure can be used to engage the first projections 130 with the wings 124. The first projections 130 of the cover 112 can also have a sliding surface 135, the purpose of which will be explained later.

Figure 4:
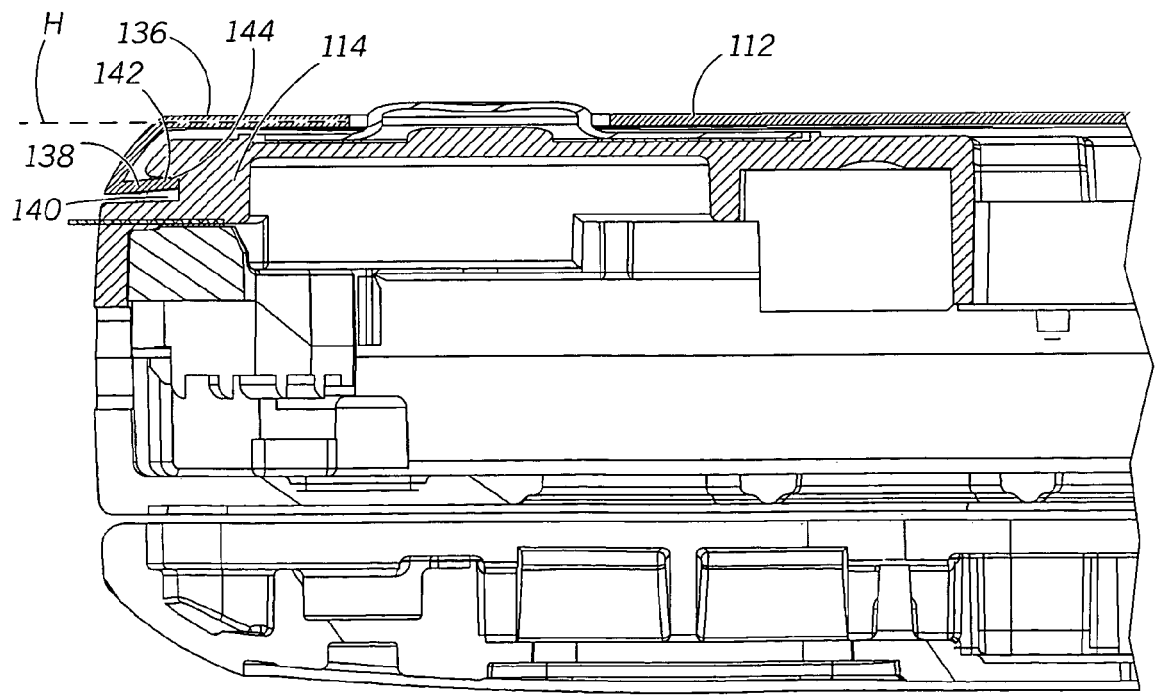
FIG. 4 illustrates another cross section of the portable electronic device of FIG. 1 showing another portion of the ejection mechanism in accordance with an embodiment of the inventive arrangements.

Referring to FIG. 4, another cross section of the system 100 is shown. This drawing represents the bottom half of the portable electronic device 116 (see FIG. 1), and a second end 136 of the cover 112 is shown. The cover 112 can include one or more second projections 138, and these second projections 138 can engage one or more corresponding slots 140 of the housing 114. As an example, the second projections 138 can have a slanted engaging surface 142, and the slots 140 can also have a slanted engaging surface 144. In particular, the cover 112 can have a horizontal axis H, and the second projections 138 can extend at a predetermined angle with respect to the horizontal axis H of the cover 112. When the ejection button 118 is in the first position, the engaging surfaces 142 of the second projections 138 can be positioned against the engaging surfaces 144 of the slots 140.

In one arrangement, the second projections 138 can be positioned at the second end 136 of the cover 112. In view of their design, when the engaging surfaces 142 of the second projections 138 and the engaging surfaces 144 of the slots 140 are engaged with one another as shown here, a force F can be generated near the first end 131 of the cover 112. This force F can be represented by the arrow shown in FIG. 3. The direction of at least a portion of this force F can be perpendicular or substantially perpendicular to the cover 112.

Referring back to FIG. 4, the system 100 can include any suitable number of second projections 138 and corresponding slots 140, and their numbers do not necessarily have to be equal to the number of first projections 130 and wings 124. For purposes of the invention, at least the first projections 130, the second projections 138 and the wings 124 may be considered part of the ejection mechanism 110.

Figure 5:
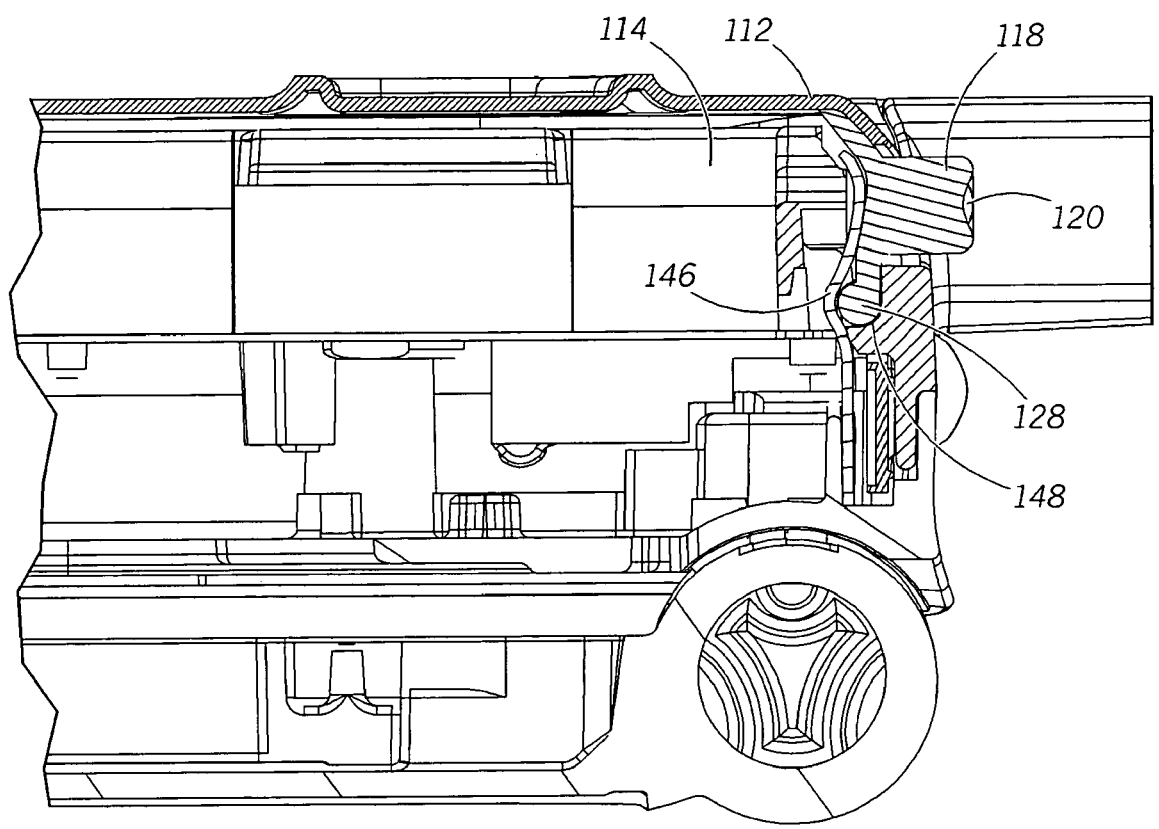
FIG. 5 illustrates another cross section of the portable electronic device of FIG. 1 taken along lines 5—5 in accordance with an embodiment of the inventive arrangements.

As noted earlier, the ejection button 118 can be movable. Referring to FIG. 5, another cross sectional view of the system 100 is shown. This cross sectional view is taken along lines 5—5 of FIG. 1. In one arrangement, the ejection mechanism 118 can include a flexible portion 146. As an example, the flexible portion 146 can be a relatively thin piece of metal, and it can be coupled to the housing 114 in any suitable fashion. At least a portion of the flexible portion 146 can be positioned against the ejection button 118. As another example, the flexible portion 146 can be shaped in such a way that it is biased to maintain the ejection button 118 in the first position.

For example, if a person presses the head 120 of the ejection button 118, the ejection button 118 can move away from the first position. The flexible portion 146 can move along with the ejection button 118. When the person releases the ejection button 118, the flexible portion 146 can cause the ejection button 118 to return to the first position. It is understood, however, that the flexible portion 146 can bias the ejection button 118 in other suitable positions.

As also explained earlier, the ejection button 118 can include a cylindrical portion 128 (see also FIG. 2). In one arrangement, the housing 114 can include a pivot point 148, which can be any suitable area for receiving the cylindrical portion 128. The cylindrical portion 128 can mate with the pivot point 148, which can be accomplished by positioning the cylindrical portion 128 in or on the pivot point 148, for example. This configuration can help secure the ejection button 118 to the housing 114 and can also facilitate the movability of the ejection button 118.

Figure 6:
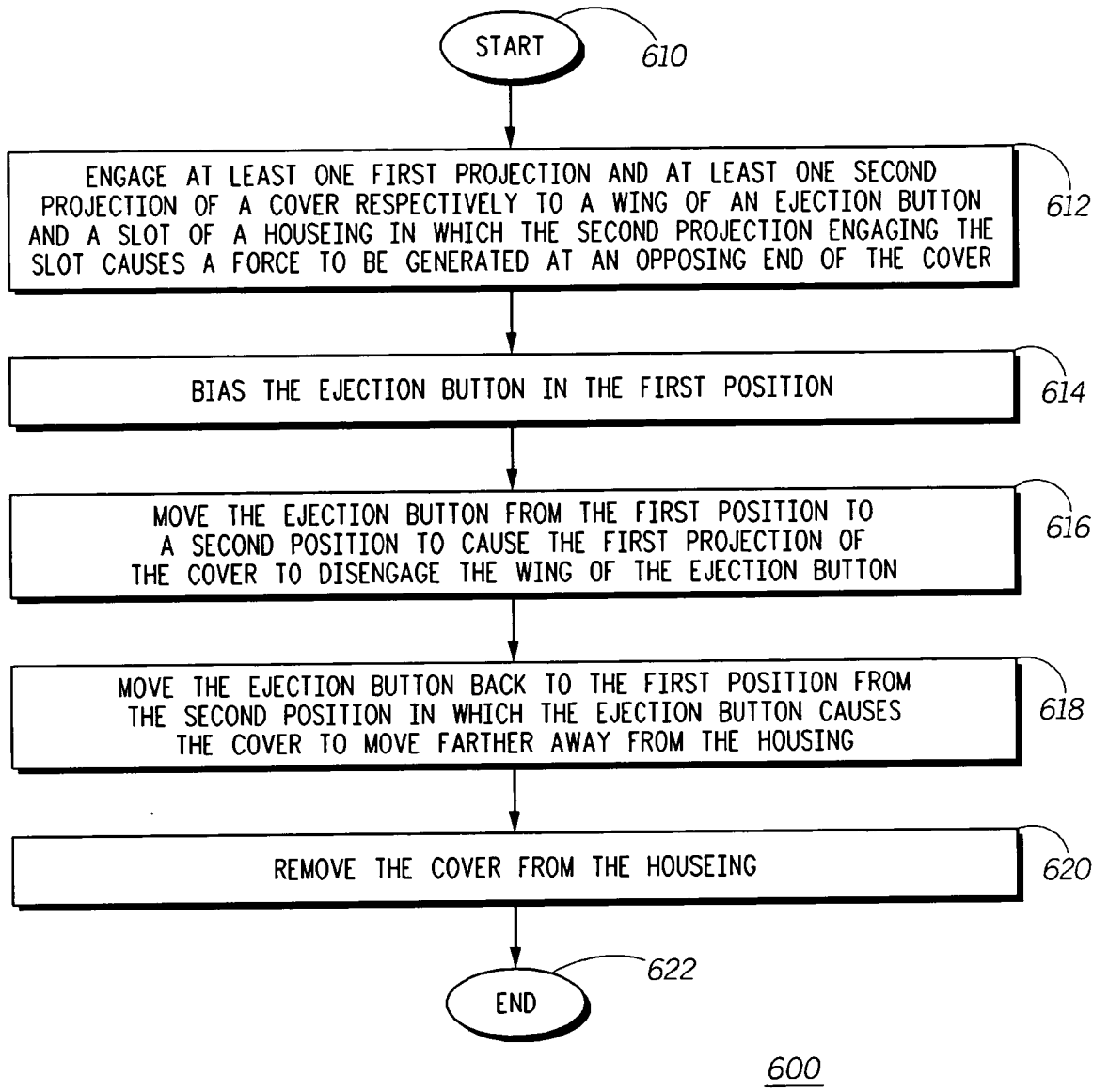
FIG. 6 illustrates a method of operating an ejection mechanism in accordance with an embodiment of the inventive arrangements.
Figure 7:
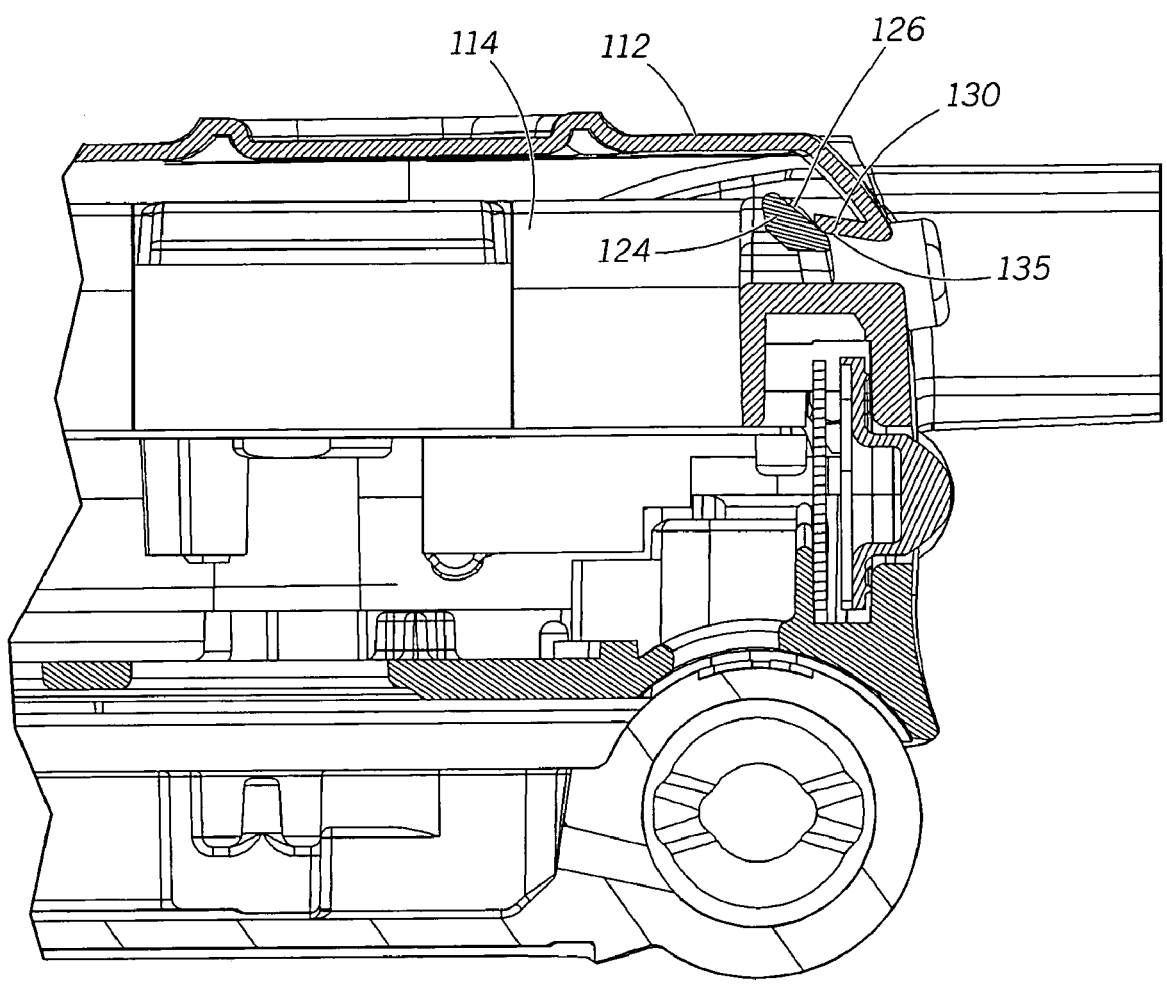
FIG. 7 illustrates the cross section of the portable electronic device in FIG. 3 in which a portion of the ejection mechanism is shown in an open stage in accordance with an embodiment of the inventive arrangements.

Referring to FIG. 6, a method 600 for operating an ejection mechanism is shown. To describe the method 600, reference will be made to FIGS. 1–5. Reference will also be made to FIG. 7, which illustrates the cross section view of the portable electronic device of FIG. 1 taken along lines 3—3 with the ejection button 118 in a second position. It must be noted, however, that the method 600 can be practiced with any other suitable system or component. Moreover, the invention is not limited to the order in which the steps are listed in the method 600. In addition, the method 600 can contain a greater or a fewer number of steps than those shown in FIG. 6.

At step 610, the method 600 can begin. At step 612, at least one first projection and at least one second projection of a cover can be respectively engaged to a wing of an ejection button and a slot of a housing in which the second projection engaging the slot causes a force to be generated at an opposing end of the cover. At step 614, the ejection button can be biased in a first position.

For example, referring to FIGS. 1–5, a user can insert the second projections 138 of the cover 112 into the slots 140 of the housing 114, and the engaging surfaces 142 of the cover 112 can engage the engaging surfaces 144 of the slots 140. The user can then push the cover 112 towards the housing 114, which can cause the first projections 130 of the cover 112 to engage the wings 124 of the ejection button 118.

In particular, referring to FIG. 7, the sliding surface 135 of the cover 112 can move along the surface 126 (see also FIG. 2). As this happens, the ejection button 118 and the wings 124 can be moved from the first position described above, and the wings 124 can eventually engage the first projections 130, as shown in FIG. 3. At this point, the ejection button 118 can be in the first position, and the cover 112 can be secured to the housing. As also described earlier, the configuration of the second projections 138 and their engagement with the slots 140 can cause the force F to be generated at the first end 131 of the cover 112. In addition, the flexible portion 146 (see FIG. 5) can bias the ejection button 118 in the first position.

Referring back to the method 600 of FIG. 6, at step 616, the ejection button can be moved from the first position to a second position to cause the first projection of the cover to disengage the wing of the ejection button. For example, referring to FIGS. 1, 2, 5 and 7, a user can press the head 120 of the ejection button 118, and this pressing force can overcome the bias of the flexible portion 146. In response, the head 120 of the ejection button 118 can move towards the housing 114, and the cylindrical portion 128 can rotate at the pivot point 148. As an example, the ejection button 118 can move and the first projections 130 can disengage the wings 124 of the ejection button 118. The force F (see FIG. 3) can now cause the cover 112 to lift up, and the first projections 130 may rest on the surfaces 126 of the wings 124, such as shown in FIG. 7. The lifting of the cover 112 can cause it to move away from the housing 114. At this point, the ejection mechanism 118 can be considered in a second position. Of course, this description is merely one example of a second position, as other arrangements are within the scope of the invention.

Referring back to the method 600 of FIG. 6, at step 618, the ejection button can be moved back to the first position from the second positioning in which the ejection button can cause the cover to move farther away from the housing. At 620, the cover can be removed from the housing. The method 600 can then end at step 622.

For example, referring once again to FIGS. 1, 5 and 7, the user can release the head 120 of the ejection button 118, and the flexible portion 146 can force the ejection button 118 to move back towards the first position. As an example, the ejection button 118 can move until the head 120 is extended to its maximum distance outside the housing 114, as is the case in FIGS. 1 and 5. Although the first projections 130 are no longer engaged with the wings 124 of the ejection button 118, having the ejection button 118 in the position where the head 120 is extended to this maximum distance can also be considered as having the ejection button 118 in the first position.

As the ejection button 118 is moving back towards the first position, focusing on FIG. 7, the wing 124 can move to the right. This process can cause the sliding surface 135 of the first projection 130 to slide up the surface 126 of the ejection button 118. In doing so, the ejection button 118 can cause the cover 112 to move even farther away from the housing 114. Because the cover 112 has been moved away from the housing 114, there is room for the user to grasp the cover 112 and remove it from the housing 114. The process of securing the cover 112 to the housing 114 and then removing the cover 112 in this fashion can be repeated as necessary.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An ejection mechanism, comprising:
    a movable ejection button having at least one wing; and
    a cover having at least one first projection and at least one second projection;
    wherein when the ejection button is in a first position, the first projection of the cover engages the wing of the ejection button and the second projection engages a slot of a housing;
    wherein the second projection engaging the slot of the housing causes a force to be generated at an opposing end of the cover;
    wherein when the ejection button is moved to a second position, the first projection of the cover disengages the wing of the ejection button and the generated force causes the cover to move away from the housing.

2. The ejection mechanism according to claim 1, wherein the cover has a horizontal axis and the second projection of the cover extends at a predetermined angle with respect to the horizontal axis of the cover.

3. The ejection mechanism according to claim 1, wherein the cover is a battery cover and the housing is part of a portable electronic device.

4. The ejection mechanism according to claim 1, wherein the ejection button further comprises a head that extends beyond the housing, wherein the head receives an object that will move the ejection button.

5. The ejection mechanism according to claim 1, further comprising a flexible portion, wherein at least part of the flexible portion is positioned against the ejection button and wherein the flexible portion is biased to maintain the ejection button in the first position.

6. The ejection mechanism according to claim 1, wherein the ejection button further comprises a cylindrical portion, wherein the cylindrical portion mates with a pivot point and facilitates the movability of the ejection button.

7. The ejection mechanism according to claim 1, wherein the first projection is positioned at a first end of the cover and the second projection is positioned at an opposing second end of the cover.

8. The ejection mechanism according to claim 1, wherein when the ejection button is moved back to the first position from the second position, the ejection button causes the cover to move farther away from the housing.

9. The ejection mechanism according to claim 8, wherein the wing of the ejection button comprises a sliding surface that contacts the first projection and causes the first projection to move away from the housing when the ejection button is moved back to the first position from the second position, which causes the cover to move farther away from the housing.

10. A portable electronic device, comprising:
    a housing having at least one slot;
    a movable ejection button having at least one wing; and
    a cover having at least one first projection and at least one second projection;
    wherein when the ejection button is in a first position, the first projection of the cover engages the wing of the ejection button and the second projection engages the slot of the housing;
    wherein the second projection engaging the slot of the housing causes a force to be generated at an opposing end of the cover;
    wherein when the ejection button is moved to a second position, the first projection of the cover disengages the wing of the ejection button and the generated force causes the first projection of the cover to disengage from the wing of the ejection button and causes the cover to move away from the housing.

11. The electronic device according to claim 10, wherein the cover has a horizontal axis and the second projection of the cover extends at a predetermined angle with respect to the horizontal axis of the cover.

12. The electronic device according to claim 10, wherein the electronic device is a mobile communications unit and the cover is a battery cover.

13. The electronic device according to claim 10, wherein when the ejection button is moved back to the first position from the second position, the ejection button causes the cover to move farther away from the housing.

14. The electronic device according to claim 13, wherein the wing of the ejection button comprises a sliding surface that contacts the first projection and causes the first projection to move away from the housing when the ejection button is moved back to the first position from the second position, which causes the cover to move farther away from the housing.

15. A method of operating an ejection mechanism, comprising:
    engaging at least one first projection and at least one second projection of a cover respectively to a wing of an ejection button and a slot of a housing, wherein the second projection engaging the slot causes a force to be generated at an opposing end of the cover; and
    moving the ejection button from a first position to a second position to cause the first projection of the cover to disengage the wing of the ejection button;
    wherein the generated force causes the cover to move away from the housing.

16. The method according to claim 15, further comprising biasing the ejection button in the first position.

17. The method according to claim 15, further comprising moving the ejection button back to the first position from the second position, wherein the ejection button causes the cover to move farther away from the housing.

18. The method according to claim 17, further comprising removing the cover from the housing.

* * * * *